Feb. 9, 1960  D. H. LANCTOT  2,924,033
MODEL SATELLITE SYSTEM
Filed Dec. 26, 1957

INVENTOR.
DONALD H. LANCTOT
BY *Elliott & Pastoriza*
ATTORNEYS

United States Patent Office 2,924,033
Patented Feb. 9, 1960

2,924,033

MODEL SATELLITE SYSTEM

Donald H. Lanctot, Malibu, Calif., assignor, by direct and mesne assignments, to Don-Lan Electronics Co.

Application December 26, 1957, Serial No. 705,255

1 Claim. (Cl. 40—106.22)

This invention relates generally to the field of novelty devices useful as toys or for advertising purposes and more particularly to a satellite system simulating a moon orbiting about the earth.

It is a primary object of this invention to provide a simple model satellite system which is extremely economical to manufacture, employs a minimum number of working parts, and yet provides a satellite orbiting about a globe without any visible means of support.

More particularly, it is an object to provide a model satellite system of the above type in which the globe representing the earth rotates while the satellite sphere is revolving thereabout.

These and many other objects and advantages of the present invention are attained by providing a hollow globe which may have on its outer surface a map of the world. This globe is provided with a lower end opening receiving an upright standard. The upper end of the standard terminates in a bearing point receivable within a bearing cup on the inside zenith of the globe so that the globe is rotatably mounted on the standard.

Means are provided for blowing air up through the standard to the interior of the globe to maintain the interior air pressure of the globe greater than the ambient air pressure. A small air nozzle or hole is provided in the globe between the North Pole and equatorial plane.

The cooperating satellite may comprise a hollow plastic sphere similar to a "Ping-pong" ball. A continuous jet stream of air from the hole in the globe will support this sphere at a relatively constant distance from the globe. By angulating the axis of the hole with respect to a normal to the globe, a tangential component of the jet stream of air therefrom will result in a reaction sufficient to rotate the globe so that the satellite sphere will revolve about the globe.

In an improved modification, a light is incorporated in the standard in the interior of the globe to pass light rays through the air hole, or alternatively, through a small plastic window containing the air hole to light one side of the satellite sphere and thus provide different phases as it revolves about the globe.

A better understanding of the invention will be had by referring to a preferred embodiment thereof as illustrated in the accompanying drawings, in which.

Figure 1:
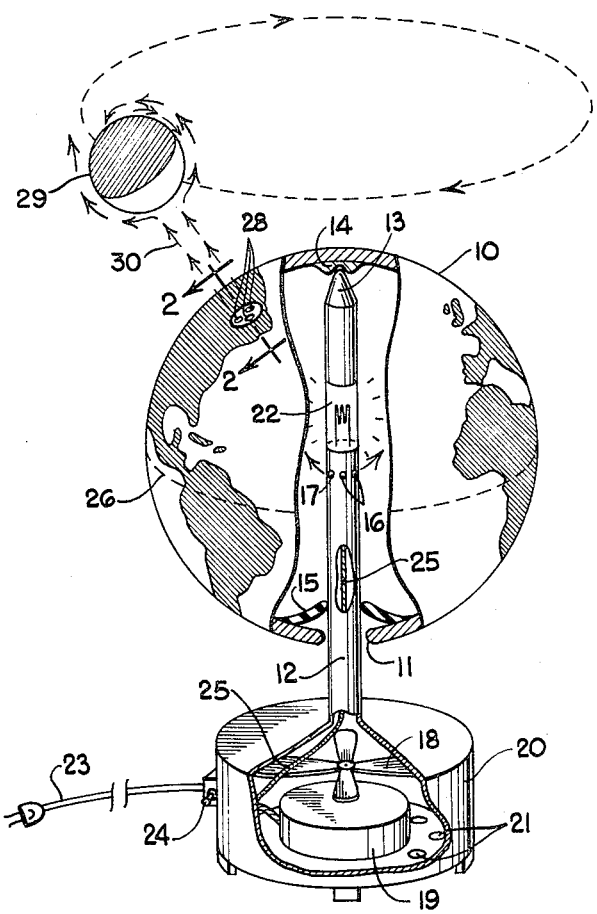
Figure 1 is a cutaway perspective view of the model satellite system.

Referring first to Figure 1, there is shown a globe 10 which may include a conventional map of the world. As shown, the lower end of the globe includes an end opening 11 receiving a vertical hollow stand 12. The stand 12 terminates at its upper end in a bearing point 13 receivable within an inverted bearing cup 14 secured to the upper inside of the globe. By this arrangement, the globe 10 may rotate about an axis coincident with the axis of the stand 12. Preferably, a flexible annular diaphragm 15 is connected at its outer peripheral edge to the edge of the opening 11 to rest against the adjacent wall portion of the stand 12. The purpose for this diaphragm will be described in detail when the operation of the system is set forth.

The standard 12 includes lateral air openings such as 16 and 17 for passing air into the interior of the globe. This air may be provided by a blower such as fan 18 driven by a motor 19 all housed within a suitable base 20 supporting the stand 12. The floor of the base 20 includes small air openings 21 to permit air to pass into the base 20 and up through the stand 12. Above the lateral air outlet openings in the stand, there may be provided a light 22. A power cord 23 leads in through a switch box 24 at one side of the base 20 and serves to power the motor 19 and also connect through a branch lead 25 passing up through the interior of the stand 12 to the light 22.

At a point between the North Pole and equator line 26 of the globe 10, there is provided a small window 27 which may be of transparent plastic material provided with air openings or holes 28. A sphere 29, preferably of hollow plastic construction such as a ping-pong ball, is positioned a spaced distance from the globe 10.

Figure 2:
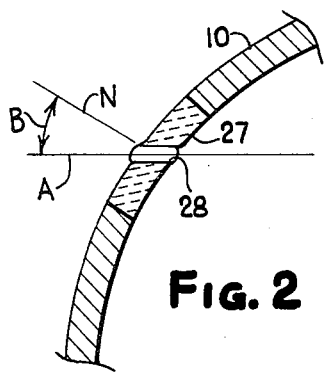
Figure 2 is an enlarged fragmentary cross sectional view of one of the air openings in the surface of the globe taken in the direction of the arrows 2—2 of Figure 1; and, Figure 3 is a plan view of the air holes in the globe.
Figure 3:
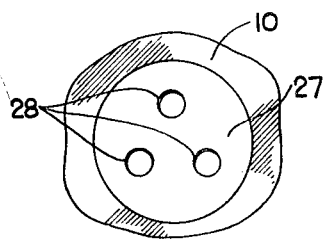

Referring to Figure 2, it will be noted that each of the holes 28 is disposed with its axis A at an angle B to the normal N of the globe surface. This inclination of the hole axis is with respect to a plane passing through the North and South Poles and the hole so that a tangential component of the jetted air stream will act in a direction to provide a rotational moment for the globe 10. It has been found that a jet stream provided from three closely spaced openings is preferable to that from a single opening. In Figure 3, the three openings are illustrated as arranged on the vertices of an equilateral triangle. The plastic window incorporating the holes 28 permits a suitable amount of light to pass from the interior of the globe as from the light bulb 22 to shine on the facing portion of the sphere 29 and thus, to an observer standing away from the system, phases of the sphere 29 will be observed. In a darkened environment, it is not necessary to provide an actual window 27 but the air hole or holes themselves will emit sufficient light to provide the desired effect.

In operation, the blower motor 19 will rotate the fan 18 to pass air up through the stand 12 to the interior of the globe 10. The air pressure in the interior of the globe 10 will rise above that of the ambient air and this increased air pressure will tend to urge the diaphragm portions engaging the stand 12 into airtight engagement therewith. However, the air pressure is not sufficient to cause undue friction to exist between the diaphragm and the stand. The increased air pressure in the globe 10 will result in an air stream 30 being jetted from the air holes 28 in the plastic window 27 and this air will pass, as indicated by the arrows, in a direction away from the globe 10 to strike the sphere 29. Because of the spherical shape, and the well known principles of aerodynamics, the initial unbalance of air striking the sphere 29 will cause the same to rotate in a clockwise direction as viewed in Figure 1. This rotation will set up a turbulence on the top portion of the sphere 29 and tend to minimize any turbulence at the bottom portion whereby a net air pressure will be exerted on the bottom portion of the sphere 29 to support the same.

As the globe 10 rotates, as a consequence of the tangential component of the air stream, the sphere 29 will follow the air stream and thus to an observer the sphere will be revolving about the globe 10 in an orbit as indicated by the dotted lines at the top of the drawing. With the light 22 illuminated, different phases of the satellite will be visible as it revolves in its orbit.

The air passing through the bottom holes 21 in the casing 20 serves the additional function of cooling the motor 19.

As an alternative to the use of a tangential component of the air stream for rotating the globe, other means may be employed. For example, the drive shaft for the fan 18 could be extended and coupled through suitable reduction gearing to positively rotate the globe. Further, a rotary air seal could be provided in the standard and a direct tubular connection made from the openings 16 and 17 to the air holes 28 in the globe. Such modifications will readily occur to those skilled in the art and need not be described in detail here.

It will be immediately evident from the foregoing description that the present invention provides a novel model satellite system which is not only useful as a toy or amusement device but also will find wide application as an advertising medium. Modifications such as set forth above as well as others that fall within the scope and spirit of the present invention will occur to those skilled in the art. The satellite system is, therefore, not to be thought of as limited to the specific embodiment set forth for illustrative purposes.

What is claimed is:

A satellite system comprising, in combination: a globe having an opening in its lower end; a vertical hollow stem passing into said opening and terminating in a bearing point at the inside top portion of said globe; a bearing cup receiving said point to rotatably mount said globe for rotation about an axis coincident with the axis of said stand; flexible diaphragm means annularly connected to the periphery of said opening and engaging the peripheral portion of said stand adjacent said lower end; a base supporting said stand; blower means in said base for passing air up into said stand, said stand having air openings into the interior of said globe so that the air pressure in said globe is maintained higher than the ambient air pressure; a sphere spaced from said globe, said globe having a hole in its surface from which an air stream projects to provide the sole support for said sphere, the axis of said hole being inclined with respect to a plane passing diametrically through the North and South Poles of said globe and said hole so that a component of said air stream is tangential to said globe whereby the reaction from said component rotates said globe and said sphere follows said air stream to describe an orbit about said globe; and a light in said globe, said light passing rays through said hole to illuminate one side of said sphere.

References Cited in the file of this patent

UNITED STATES PATENTS

| | | |
|---|---|---|
| 295,037 | Miller | Mar. 11, 1884 |
| 1,485,322 | Winetzky | Feb. 26, 1924 |
| 1,497,150 | Maddox | June 10, 1924 |
| 1,744,680 | Sherrill | Jan. 21, 1930 |
| 1,912,960 | Aki et al. | June 6, 1953 |
| 2,055,498 | Jacobs | Sept. 29, 1956 |